United States Patent Office 3,285,339
Patented Nov. 15, 1966

3,285,339
METHOD FOR CONSOLIDATING INCOMPETENT EARTH FORMATIONS
Herbert C. Walther, Ponca City, Okla., David A. Kuhn, Wyckoff, N.J., and Derry D. Sparlin, Ponca City, Okla., assignors to Continental Oil Company, Ponca City, Okla., a corporation of Delaware
No Drawing. Filed Jan. 18, 1966, Ser. No. 521,426
7 Claims. (Cl. 166—33)

This is a continuation-in-part application of the co-pending application of the present inventors, entitled, "Method for Consolidating Material," Serial No. 427,480, filed January 22, 1965, now abandoned, which is a divisional application of the co-pending application of the present inventors, entitled, "Method for Consolidating Material," Serial No. 200,310, filed June 6, 1962.

This invention relates to a method of consolidating loose or incompenent subterranean formations. More particularly, the invention relates to improvements in methods for consolidating incompetent, subterranean formations, which methods employ a resinous composition as a consolidating agent.

In the production of subterranean fluids, such as oil, gas, water, etc., a number of difficulties are encountered when the well by which the fluids are produced penetrates a loose or unconsolidated subterranean formation. Such formations frequently are composed of loose water or oil sands, and the grains of the sand become entrained in the fluid being produced to be carried into the well bore. The result of such entrainment, among other things, is the abrasion of the pumping equipment in the well bore, the clogging of strainers, and the sanding in of the cavity immediately adjacent the strainer. These results in turn ultimately cause a sharp decrease in the rate of production and high maintenance costs.

In an effort to reduce the deleterious results generally associated with producing fluids from an unconsolidated formation, it has heretofore been proposed to inject an age-hardenable cementing agent into the producing formation adjacent the well bore in order to consolidate or make rigid the formation. The cementing agent directly contacts the loose grains or particles in the formation and, by bonding them to each other, reduces their mobility.

One of the cementing agents widely used in such previous processes, and also in the instant process, is a resin-forming composition containing formaldehyde, phenol, and a suitable catalyst. In one consolidating method, this composition, in liquid form, is pumped down the well bore and into the formation where it sets up to a hardened state upon standing. A variety of means is employed for flushing the excess resin from the formation so that the permeability of the formation is retained.

As evidenced by the substantial number of relatively recent innovations and modifications which have been developed in the basic phenol-formaldehyde resin process, this method of formation consolidation does not as yet afford an entirely satisfactory solution to the difficulties associated with unconsolidated formations. One of the problems which has not been solved to the most desirable degree is that of obtaining a strong or tenacious bond between the resinous material and the particles of sand or other particulate materials in the formation. As a result, effective consolidation is often not achieved.

One of the efforts to improve the tenacity of the bond which is established between the formation particles and the resin is described in U.S. Patents 2,378,817 and 2,604,172 to Gilbert G. Wrightsman, which consists primarily of introducing into the formation an agent capable of rendering the formation particles wettable by the resin-forming liquid. Although a substantial improvement in the uniformity and tenacity of the bond which is established between the resin and formation particles results from use of this technique, the strength of such bond is still far lower than optimum.

One aspect of the present invention concerns a novel and practical method for consolidating loose or incompetent formations of the type described, which results in a strong, tenacious bond between a resinous material which is pumped into and set up in the formation, and the grains of material composing the formation.

By the use of the invention, the compressive or crushing strength of consolidated silicious materials may be greatly enhanced as compared to the crushing strength obtainable by employing any of the phenol-formaldehyde consolidation methods heretofore in use. Moreover, the method of the invention does not result in any serious reduction in formation permeability.

In one of its broader aspects, the invention resides in the use of certain types of chemical compounds to chemically couple, or bond, age-hardenable resin molecules to impart great rigidity and strength to the consolidated formation.

In general, the coupling agents which are employed have a molecular structure which is (a) characterized by having a first functional group located at an exposed position in the molecule for reacting with the resinous material which is used for consolidating the formation, and (b) is further characterized in having a second functional group, or an atom, located at a second exposed location in the molecule for establishing a chemical bond with the granular material of the formation. The coupling agent thus provides a strong chemical bridge linking the molecules of the consolidating resinous materials to the grains of material in the formation.

Coupling agents of the general type described include, but are not limited to, Werner-type co-ordination compounds consisting of transition metal salt complexes of alpha, beta unsaturated acyclic carboxylic acids, particularly the cobalt, chromium, zinc, and nickel complexes, and organo-functional silanes, such as γ-aminopropyltriethoxysilane, and δ-aminobutylmethyldiethoxysilane. Other specific examples of these and other types of suitable compounds will appear hereinafter.

In one method of practicing the process of the present invention, the formation to be consolidated is first isolated by means well-known in the art, such as, by packers. A quantity of diesel oil or other inert hydrocarbon material, such as distillate or crude oil, is then injected into the formation to flush out the formation and cleanse the formation particles. A solution or mixture containing the coupling agent is next injected into the formation together with, in some instances, a plugging retardant. This step is followed by the injection into the formation of a liquid to remove excess coupling agent. Then follows a resin treatment which comprises the steps of injecting a volume of a resin mixture into the formation, removing the excess plastic material from the interstices between the formation particles by flushing with an inert flushing material, and finally shutting in the well to maintain a static condition within the formation for a sufficient period of time to permit the plastic to set up to a hardened state.

While the above brief description presents a preferred method of practicing the invention, certain deviations in this process may be made without departing from the spirit of the invention. For example, the coupling agent may be added directly to the resin mixture in one alternative, or the coupling agent may be incorporated into the overflush and placed in the formation after the resin has been injected, as a second alternative.

By the described process, the state of formation consolidation is vastly improved in that a more rigid, tenaciously interconnected structure is formed without decrease in formation porosity to a detrimental degree. The crushing strength of the consolidated formation materials is generally increased by a factor of at least 5, and the permeability of the formation is ordinarily decreased by not more than 35 percent, and usually substantially less.

From the foregoing description, it will be apparent that it is a major object of the present invention to improve presently used processes of consolidating incompetent formations wherein an age-hardenable plastic or resinous material is injected into the loose formation to harden.

It is a more specific object of the invention to improve the methods now in use for rendering competent, loose or unconsolidated formations from which a fluid is being produced, which methods utilize a phenol-formaldehyde resin as the consolidating material. The basic principle underlying the invention may, however, be employed when other types of organic resins, such as urea, melamine, polyester, and acrylic, are used.

Another object of the invention is to increase the permanency and degree of consolidation effected by artificial means in a porous, fluid-producing formation.

A further object of the present invention is to impart a higher crushing or compressive strength to an artificially consolidated subterranean formation than has heretofore been possible using methods previously known.

Another object of the invention is to improve the strength and durability of the porous skeletal structure of an artificially consolidated subterranean formation without seriously decreasing the permeability of the formation.

Another object of the invention is to provide an improved practical process for consolidating incompetent subterranean formations, which process is sufficiently simple in nature to permit it to be practiced relying largely upon consolidating techniques heretofore known and appreciated.

A further object of this invention is to provide a practical process for consolidating incompetent subterranean formations wherein an amount of overflush is not critical.

A more specific object of the present invention is to provide an improved process for consolidating incompetent subterranean formations using a partially polymerized resin mixture.

Other objects and advantages of the invention will become apparent as the following detailed description of the invention is read.

Before describing in greater detail one series of steps entailed in the process of the invention, the coupling agents which are employed in practicing the process and the mechanism by which they act in forming a chemical bridge between the silicious material in the formation and the consolidating resinous material will be discussed. Typically, such coupling agents will comprise molecules having a group or atom which is capable of reacting with, or being strongly held by, the formation sands and having a reactive organic group which orients outwardly from the sand and is capable of combining with the consolidating materials. Molecular species of this general type include Werner complex-type compounds in which the multivalent transition metals, preferably chromium, cobalt, nickel, copper, lead, and zinic, are co-ordinated with a carboxylic acido group; vinyl-trichlorosilanes; and certain aminooalkylethoxysilanes. Preferred in the latter group of compounds are those in which at least one of the alkyl substituents of the silicon atom is at least [three] atoms in chain length so that the amino group [attached] to the terminal carbon atom of such [group is] located no closer to the silicon atom than [the γ-] position. γ-, δ-, and ε-aminoalkylethoxy-[silanes are] satisfactory as are higher homologues of these materials having extended alkyl chains attached to the silicon atoms, with the amino group bound to the terminal carbon atom of such extended alkyl chains.

Of the Werner complexes employed, those containing an alpha, beta unsaturated acyclic carboxylic acido group containing from two to six carbon atoms in the aliphatic chain, such as acrylic acido and substituted acrylic acido groups, are preferred. Among other acid types which may be used are sorbic acid, crotonic acid, propionic acid, vinyl acetic acid, allyl acetic acid, oleic acid, maleic acid, and adipic acid. Chromium and cobalt are the preferred metals of the complex.

In addition to and in some cases complementary with the above general discussion of the characteristics of coupling agents which may be used in the present invention, a number of types of chemical structural formulas have been recognized as being suitable for use in the process. In many of the following structural examples, the symbol "X" will appear and will be identified as an anion. For further clarification, which need not be repeated in each of the individual examples, it should be stated that any anion is contemplated by "X." Generally, however, $Br^-$, $Cl^-$, $F^-$, $I^-$, $(NO_3)^-$, and $(ClO_4)^-$ are preferred. For convenience and reference, these structural-type formula will be set forth hereinafter in numbered order. Water bound in the co-ordination shell is not shown.

(1) 1,2-diamines and transition metal ions.

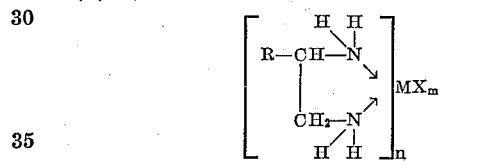

wherein:

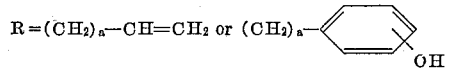

($a = 0-5$)

$X =$ an anion
$M = Ni^{II}, Cu^{II}, Zn^{II}, Cd^{II}, Cr^{III}$ or $Co^{III}$
$n = 1$ or 2.
$m = 2$ or 3

The following specific structural example of 3,4-diaminobutene-1-tetraaquocobalt (III) chloride is typical of compounds of this type:

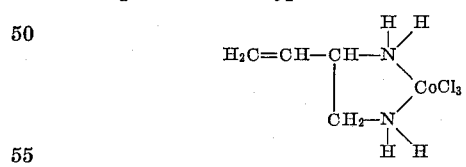

Diaquobis (p - hydroxyphenylethylenediamine) chromium (III) perchlorate and bis(3,4-diaminobutene-1) diaquochromium (III) chloride are further examples of compounds which typify this group of coupling agents.

(2) Substituted salicylaldehydes and transition metal ions.

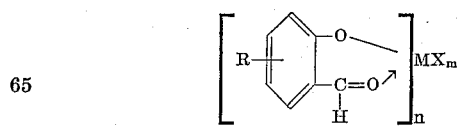

wherein:

$R = -NH_2$ or $-OH$ or
$-(CH_2)_a-CH=CH_2$
($a = 0-5$)
$M = Mn^{II}, Fe^{II}, Co^{II}, Ni^{II}, Cu^{II}, Zn^{II}, Cd^{II}, Pb^{II}, Cr^{III}$ or $Co^{III}$
$n = 1$ or 2
$m = 1$ or 2

The following specific structural example of bis (2,4-dihydroxybenzaldehydato) diaquochromium (III) chloride is typical of compounds of this type:

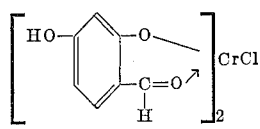

Bis (2-hydroxy-4-aminobenzaldehydato) diaquochromium (III) chloride; 2,4-dihydroxybenzaldehydatotetraaquocobalt (III) perchlorate; and 2-hydroxy-4-aminobenzaldehydeatodiaquonickel (II) nitrate are further examples of compounds which typify this group of coupling agents.

(3) β-diketones and transition metal ions.

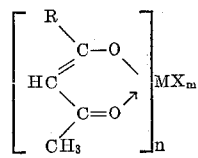

and

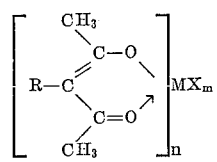

wherein:
R=—$(CH_2)_a$— —OH, or
$(CH_2)_a$—CH=$CH_2$, or
—$(CH_2)_b$—$NH_2$
(a=0–5, b=1–5)
X=an anion
M=$Mn^{II}$, $Fe^{II}$, $Co^{II}$, $Ni^{II}$, $Cu^{II}$, $Zn^{II}$, $Cd^{II}$, $Co^{III}$, $Mn^{III}$ or $Cr^{III}$
n=1 or 2
m=1 or 2

The following specific structural example of bis(6-heptene-2,4-dionato)diaquochromium (III) nitrate is typical of compounds of this type:

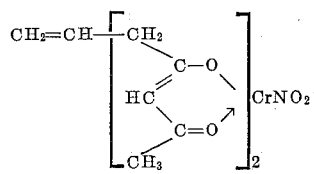

The following specific structural example of 3-aminomethyl-2,4-pentanedionatodiaquonickel (II) chloride is typical of compounds of this type:

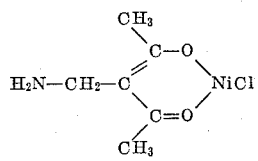

Bis(3-hydroxyphenyl - 2,4 - pentanedionato)diaquocobalt (III) chloride; bis(1-hydroxyphenyl-2,4-pentanedionato)diaquochromium (III) nitrate; and 1-hydroxyphenyl - 2,4 - pentanedionatotetraaquochromium (III) nitrate are further examples of compounds which typify these groups of coupling agents.

(4) α-aminocarboxylic acids and transition metal ions.

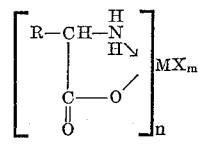

wherein:
R=—$(CH_2)_a$—CH=$CH_2$, or
—$(CH_2)_a$—⟨C₆H₄⟩—OH, or
—$(CH_2)_b$—$NH_2$
(a=0–5, b=1–5)
X=an anion
M=$Mn^{II}$, $Fe^{II}$, $Co^{II}$, $Ni^{II}$, $Cu^{II}$, $Zn^{II}$, $Cd^{II}$, $Co^{III}$ or $Cr^{III}$
m=1 or 2
n=1 or 2

The following specific structural example of bis(tyrosinato)diaquochromium (III) nitrate is typical of compounds of this type:

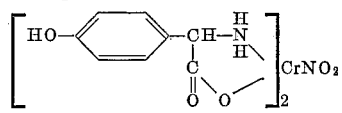

Bis(lysinato)diaquocobalt (III) chloride; tyrosinatotetraaquochromium (III) chloride; and tyrosinatodiaquocopper (II) nitrate are further examples of compounds which typify this group of coupling agents.

(5) α-hydroxycarboxylic acids and transition metal ions.

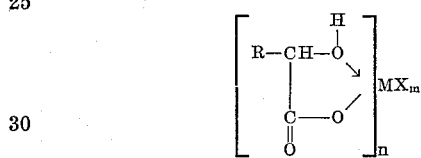

wherein:
R=$(CH_2)_a$—⟨C₆H₄⟩—OH, or
$(CH_2)_a$—CH=$CH_2$, or
$(CH_2)_b$—$NH_2$
(a=0–5, b=1–5)
X=an anion
M=$Mn^{II}$, $Fe^{II}$, $Co^{II}$, $Ni^{II}$, $Cu^{II}$, $Zn^{II}$, $Cd^{II}$, $Co^{III}$, $Cr^{III}$ or $Zr^{IV}$
n=1 or 2
m=1–3

The following specific structural example of p-hydroxyphenyllactatodiaguonickel (II) chloride is typical of compounds of this type:

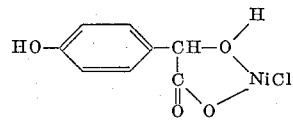

p-Hydroxyphenyllactatotetraaquochromium (III) chloride and α-hydroxy-β-aminopropionatodiaquocopper (II) nitrate are further examples of compounds which typify this group of coupling agents.

(6) 8-hydroxyquinolins and transition metal ions.

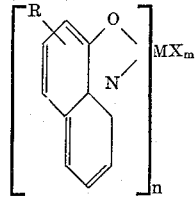

wherein:
R=—OH, or
—$(CH_2)_a$ $NH_2$, or
—$(CH_2)_a$—CH=$CH_2$
(a=0–5)
X=an anion
M=$Co^{II}$, $Ni^{II}$, $Cu^{II}$, $Zn^{II}$, $Cr^{III}$ or $Co^{III}$
m=1 or 2
n=1 or 2

The following specific structural example of bis(6-hydroxy - 8 - quinolinolato)diaquocobalt (III) chloride is typical of compounds of this type:

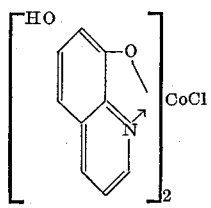

Bis(6-amino - 8 - quinolinolatodiaquochromium (III) chloride; bis(5-amino - 8 - quinolinolatodiaquochromium (III) chloride; and 5-vinyl-8-quinolinolatodiaquonickel (II) nitrate are further examples of compounds which typify this group of coupling agents.

(7) Schiff bases of salicylaldehyde and transition metal ions.

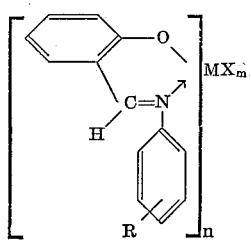

wherein:
R=—OH or
—(CH$_2$)$_a$—NH$_2$ or
(CH$_2$)$_a$—CH=CH$_2$
(a=1–5)
X=an anion
M=Cu$^{II}$, Ni$^{II}$, Co$^{II}$, Fe$^{II}$, Zn$^{II}$, Cr$^{III}$ or Co$^{III}$ The following specific structural example of salicylaldehyde-p-aminophenyliminatodiaquocopper (II) nitrate is typical of compounds of this type:

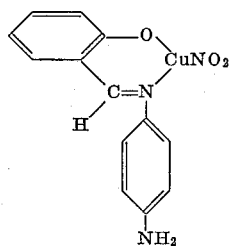

Bis(salicylaldehyde - p - hydroxyphenyliminatodiaquochromium (III) chloride and salicylaldehyde-m-aminomethylphenyliminatotetraaquocobalt (III) per chlorate are further examples of compounds which typify this group of coupling agents.

(8) Silyl ethers with functional groups which will bond to the plastic.

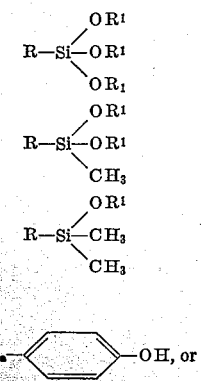

—(CH$_2$)$_a$—CH=CH$_2$, or

—(CH$_2$)$_a$—NH—C(=O)—NH$_2$ (a=1–5)
R$^1$=—(CH$_2$)$_b$ CH$_3$
(b=0–4)

The following specific structural example of α-aminopropyltriethoxysilane is typical of compounds of this type:

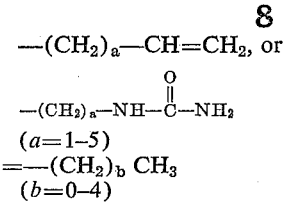

Methyl-β-aminoethyldimethoxysilane and dimethyl-β-(p-hydroxyphenyl)ethylethoxysilane are further examples of compounds which typify this group of coupling agents.

As illustrative of the manner in which a typical coupling agent of the Werner complex-type functions, the use of one of the preferred agents, methacrylatochromic chloride, in bonding phenolic resins to silicious materials may be cited. This particular coupling agent is represented by the formula:

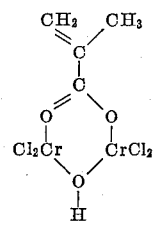

The chromium complex establishes a chemical bond through the chromium atoms with the negatively charged silicious surfaces of the formation particles. A chemical bond may then be formed between the methacrylato group and the methylene groups of the phenol-formaldehyde resin. The chemical bridge formed may thus be portrayed schematically:

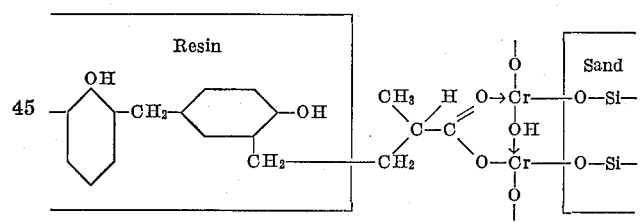

The aminoalkylethoxysilanes which may be used as coupling agents also establish chemical bridges interlinking the molecules of the resinous consolidating material and the silicious formation materials. Thus, γ-aminopropyltriethoxysilane, which is a preferred composition in this process, reacts with the aldehydic group of the phenol-formaldehyde resinous composition to form a γ-azomethinepropyltriethoxysilane, and the silicon atom of the silanol group bonds through oxygen to the silicon atoms of the formation material.

Turning now to a description of one method of practicing the process of the present invention, the initial step performed is the preparation of the formation for the injection thereinto of one of the above-described coupling agents by injecting a relatively small volume of diesel oil or other inert, neutral liquid flushing agent into the formation to clean the surfaces of the sand particles. This enhances the ability of the coupling agent to bond to the sand. The exact volume of flushing liquid which is injected will of course depend, among other things, on the thickness and porosity of the formation being treated but will usually be from .5 to 20 barrels per vertical foot of perforated formation interval to be treated; there is, however, no criticality to the amount of preflush used.

Following the initial cleansing operation, a composition, including coupling agent of the type described and a suitable carrier, is introduced into the formation. The carrier will vary considerably, according to the type of coupling agent utilized and the prevailing formation conditions, but in any case is characterized by being a solvent for the coupling agent and by being relatively inert with regard to the other constituents used in the process and to the formation.

A variety of compounds may be employed as a carrier for the coupling agent. For example, diesel fuel, water, crude oil, distillate, isopropanol, etc., may be used, depending upon the economics and convenience of a given situation and the coupling agent employed. Usually, however, diesel fuel will be a preferred carrier.

Usually the coupling agent will be from about 0.005 percent to about 10 percent of the total composition, with a preferred range of from about 0.05 percent to about 1.0 percent.

When the methacrylato chromic chloride coupling agent is employed, the normally acid complex is preferably adjusted with a nitrogen-containing base such as ammonium hydroxide to an initial pH of at least about 4.0, but not greater than about 7.0. It has been experimentally determined that an aqueous solution containing about 20 parts by volume of an isopropanol methacrylato chromic chloride solution (6 percent chromium), about 100 parts by volume of water, and about 4.4 parts by volume of a 1 percent aqueous ammonia solution gives good results in water-saturated loose sand strata. When using γ-aminopropyltriethoxysilane and δ-aminobutylmethyldiethoxysilane as coupling agents, these compounds are usually made up from about 0.005 to about 10 percent aqueous or diesel oil solutions prior to injection into the formation. Generally, a preferred solution range is from about 0.05 to about 5 percent and an optimum range from about 0.05 to about 1 percent. As in the case of the total volume of liquid used to flush out the formation initially, the volume of coupling agent which is utilized will depend, among other factors, on the porosity, composition, and size of the formation being treated. Generally from about .2 to about 20 barrels of coupling agent solution per vertical foot will be used, although a preferred range is from about .5 to about 5 barrels.

After pumping the coupling agent into the formation, a second quantity of the inert, neutral flushing agent is usually injected into the formation to spread out and disperse the coupling agent. Generally about .5 to about 5 barrels per vertical foot of formation will be used for this purpose, although as much as 10 or more barrels or sometimes no overflush may be used.

Next follows the introduction of the consolidating resinous material, usually in a suitable solvent, into the formation. In general, this may be accomplished by any of the known and widely practiced techniques now in use. Also, although the preferred resinous material to be used for consolidation is a phenol-formaldehyde type, other resins of the thermosetting type, such as alkyd resins and acrylic resins, are suitable. As examples of such resins and methods of introducing them to incompetent formations, reference may be made to U.S. Patent 2,378,817 issued to Wrightsman et al., U.S. Patent 2,604,172 issued to Wrightsman, U.S. Patent 2,823,753 issued to Henderson et al., U.S. Patent 2,981,334 issued to Powell, and U.S. Patent 2,476,015 issued to Wrightsman. In the case of the phenol-formaldehyde resinous materials, an unpolymerized, or preferably a partially polymerized, mixture of phenol and formaldehyde which includes a suitable catalyzing agent, such as an aqueous caustic solution, is pumped down the borehole and out into the formation. The amount of consolidating material used will depend on a variety of parameters, including well geometry, formation characteristics, etc. Ordinarily, the amounts used in the instant process will coincide with the amounts used in the standard phenol-formaldehyde process. Thus, generally, about .5 to about 15 barrels per vertical foot of perforated interval will be used, although a preferred range is from about .5 to about 5 barrels.

Immediately after the resinous composition is injected into the formation, the formation is again flushed with an inert, neutral material to remove excess resinous material and prevent the pores of the formation from becoming clogged. The amount of overflush may vary widely, depending upon, among other things the amount of polymerization that has taken place in the resin when it is injected. Generally, for an unpolymerized resin, less than about one barrel per foot of perforated interval will be used, while in the case of the partially polymerized resin mixture from no overflush to 10 barrels per perforated foot may be used, although in the latter case the amount of overflush is not critical and substantially more may be used.

When the coupling agent is incorporated in the overflush, the ratio of coupling agent to carrier and the total amount of overflush material used are the same as the ratios and amounts utilized when the coupling agent is injected as a preflush. Similarly, when the coupling agent is added to the resin mixture before injection, the total amount of resin mixture used will be the same amount which would have been used had the coupling agent been injected separately. In this case, the ratio of coupling agent to resin mixture will be the same as the ratio of coupling agent to carrier when the latter mixture is injected prior to the resin. As will be obvious to one skilled in the art, several of the coupling agents listed herein may, when used in higher concentrations, be expected to accelerate polymerization rates beyond optimum limits. Consequently, before practicing the invention with the higher concentrations, it may be found advisable to conduct a series of reaction rate tests using standard laboratory techniques in order to determine the optimum ratio between coupling agent and resin mixture for a given situation.

Finally, the well is shut in, or at least a flow is restricted substantially, so that the consolidating material will have an opportunity to set up to a hardened state. As will be appreciated by those skilled in the art, such setting-up time may range from about 12 to 48 hours, depending upon the resinous mixture employed and formation conditions.

As a preferred embodiment of the present invention, it has been discovered that the injection at the wellhead of a partially polymerized resin mixture gives results superior to those obtained when an unpolymerized resin mixture is used. As used herein and in the appended claims, the phrase "partially polymerized resin mixture" is used to indicate those mixtures wherein reaction or condensation has begun but wherein polymerization has not reached an end point. These mixtures consist essentially of one or more of the following classes of compounds or elements: monomers, the initial reaction or condensation product of the monomers, prepolymers, and the final polymerization product. Moreover, the term "polymerization" as used herein is intended to include condensation reactions as well as the more narrowly defined polymerization processes.

It has been found that, when a partially polymerized phenol-formaldehyde resin mixture is introduced at the wellhead, the amount of overflush used after the injection of the resin into the formation become less critical. For instance, when an unpolymerized resin is injected, the amount of later overflush must be controlled within narrow limits to maintain the advantages of the instant process. If too much overflush is used, the resin is washed from the critical portions of the formation with a resulting decline in crushing strength. When, however, the injected resin is partially polymerized, excess amounts of overflush may be used without this deleterious effect.

This phenomenon occurs over a wide range of degrees of partial polymerization, and it is believed that any significant amount of polymerization prior to injection at the wellhead will result in a decrease in the criticality of the amount of overflush later used. In practice, it is ordinarily preferred to allow polymerization to progress at least to the stage whereat the viscosity of the resin mixture is about 1.25 times the original viscosity of the mixture. The original viscosity will, of course, vary over a wide range, depending upon a variety of factors which will be obvious to one skilled in the art, not the least of which is the identity of the initial reactants or condensants. Generally, this range will vary from about 0.1 to about 10 poise, although under extreme conditions of temperature, etc., the initial viscosity may fall outside this range.

Beyond the minimum polymerization discussed above, resin mixtures wherein substantial polymerization has taken place may also be used, with a corresponding decrease in the criticality of the amount of overflush. The limiting factor in the amount of polymerization of which advantage may be taken appears to be the pumpability of the solution containing the partially polymerized resin mixture. Thus, so long as existing equipment is capable of injecting a solution containing the partially polymerized resin mixture into the formation, the upper limit on degree of allowable polymerization has not yet been reached. Generally, practical considerations preclude the use of a resin mixture wherein the partial polymerization has advanced to a point whereat the solution evinces a viscosity much above about 25 stokes.

Experience has indicated that substantially optimum conditions are reached when the partially polymerized resin mixture has polymerized to the point at which it is insoluble in diesel oil. At this point, the viscosity of the partially polymerized resin mixture is not such that it will place undue strain on the wellhead equipment, while at the same time relative large volumes of overflush may be subsequently used without washing significant amounts of the resin from the portion of the formation adjacent the well bore.

Aside from the optimum conditions mentioned above, a generally preferred range of degrees of polymerization is from the degree of polymerization at which the partially polymerized resin mixture becomes insoluble in diesel oil to the degree of polymerization which results in the solution containing the partially polymerized resin mixture having a viscosity of about 25 stokes.

The following examples will serve to illustrate methods of employing the invention. In many of these examples, there are a number of steps which are repeated several times; and for purposes of brevity, these steps will now be described in detail. Later they will be mentioned only by reference in the specific examples wherein the steps were carried out.

In each of the examples, sand cores were prepared using a Black Hawk "E" sand, which is a clean, white, silicious sand having particles ranging in size from about 60 mesh to about 325 mesh. Generally, the average size of the particles is about 100 mesh. The cores were prepared by packing a quantity of loose Black Hawk "E" sand under water into a resilient sleeve. A small quantity of 20–40 mesh clean silicious sand was placed in each end of the sleeve followed by a 60-mesh screen. Subsequently, apertured plugs were placed on each end of the sleeve to form an essentially cylindrical core.

The sand consolidation treatments which are reported in the examples were evaluated in the laboratory by treating the cores under simulated subsurface conditions. In simulating these conditions, a core was first placed in a pressure bomb which was in turn immersed in a constant temperature bath of about 160° F. A hydraulically simulated overburden pressure of about 750 p.s.i. was applied externally of the sleeve in which the sand sample was contained because of the resiliency of the sleeve, was substantially undiminished to the sand itself. Provision was made for raising the temperature to about 160° F. before they were flowed into cores.

Prior to treatment of the cores or measurement of any core parameters, the cores were flushed with 10,000 to 20,000 cc. of No. 1 diesel fuel, hereinafter called "diesel oil," to obtain irreducible water saturation.

In those experiments where permeability was determined, it was determined by measuring the diesel oil flow rate and the pressure drop across the core. Data obtained from these two variables were used in determining permeability by mathematical relationships well known in the art.

In many of the following examples, reference will be made to a standard phenol-formaldehyde resin treatment. This standard treatment utilized a phenol-formaldehyde resin prepared substantially in accordance with the procedures outlined in Examples 2 and 3 in U.S. Patent 2,981,334 and was accomplished in the following way: About 100 cc. of a solution consisting of approximately 30 percent phenol-formaldehyde resin solids and approximately 70 percent ethanol was pushed through a core, together with approximately 0.9 cc. of a 25 percent aqueous NaOH solution by about 100 cc. of diesel oil. Following the flushing with the resin, the core was left in the constant temperature bath at 160° F. for from three to five days to allow the resin to harden and consolidate the sand core. After curing, the consolidated core was removed from the sleeve and cut into ⅞-inch lengths for further tests.

*Example 1*

Four water-saturated core samples of Black Hawk "E" sand were prepared as described above; and two of the samples, A and B, were treated with the standard phenol-formaldehyde resin treatment. The remaining two samples, C and D, were flushed with 200 cc. of a 0.05 percent aqueous solution of γ-aminopropyltriethoxysilane coupling agent. Permeability was then determined, and 150 cc. of diesel oil was flushed through the cores. Subsequently, the cores were given a standard phenol-formaldehyde treatment. The results obtained are as follows:

| Core | Initial Permeability (Darcies) | Percent Return Permeability | Average Crushing Strength After 5 Days |
|---|---|---|---|
| A | 9.6 | 77 | 54 |
| B | 10.0 | 77 | 63 |
| C | 8.6 | 77 | 1,288 |
| D | 9.6 | 83 | 1,478 |

From the above results, it is at once apparent that there was a substantial increase in the crushing strength of the cores treated by a coupling agent. Moreover, it would appear that, when relatively small amounts of the coupling agent are passed through the cores, plugging is not a major problem.

*Example 2*

Example 1 was repeated substantially except that methacrylate chromic chloride was substituted for the γ-aminopropyltriethoxysilane. The sand used in the cores had a slightly different size distribution. Results of permeability and compressive strength runs on these four cores were as follows:

| Core | Compressive Strength, p.s.i. | Percent of Retained Permeability After Treatment |
|---|---|---|
| Standard Treated Core A | 112 | 76 |
| Standard Treated Core B | 122 | 77 |
| Coupling Agent Treated Core C | 898 | 74 |
| Coupling Agent Treated Core D | 823 | 68 |

The original permeabilities of all cores were the magnitude of 8–10 darcies. Thus, the maximum loss of permeability of 32 percent sustained by the second coupling agent treated core does not represent a serious or intolerable reduction in permeability. In fact, the employment of the coupling agents appears to cause only a slight additional loss of permeability when a normal amount of the coupling agent is flowed through the core.

In the preceding examples, attention has been given to the general problem of consolidating incompetent formations and to the solution of this problem. Thus far, no mention has been made of the fact that under some circumstances, for instance when relatively low permeability formations are involved, formation plugging may become a problem. While this will not always occur, it is a possible complication when the consolidation techniques discussed above are employed. Moreover, when consolidation is carried out through perforations in the well bore, which is usually the case, the portion of the formation immediately adjacent these perforations will receive a larger throughput than will the other portions of the formation. It has been observed and will shortly be demonstrated that, as increasing amounts of coupling agent are flowed through the formation, plugging becomes of increasing importance.

It has been discovered that plugging problems encountered in formation treating of the type described above may be substantially lessened and, in some cases, obviated by the use of a plugging retardant which is characterized as being a solvent for both the carrier and the coupling agent. Examples of suitable plugging retardants are the fluid alcohols, such as butanol, hexanol and isopropanol; ketones, such as acetone, diacetone, and methyl ethyl ketone; and esters, such as a $\beta$-ethoxy ethyl acetate and $\beta$-methoxy ethyl acetate. Of these, isopropanol and acetone are the preferred compounds. In practice, moreover, isopropanol will most usually be chosen, inasmuch as it might also be expected to reduce hydrolysis and, further, inasmuch as it has a sufficiently high flash point to reduce the danger of combustion at the wellhead.

In use, the plugging retardant is usually combined with the carrier, usually diesel oil, and the coupling agent. The ratio of plugging retardant to carrier may be from about 2 percent to about 100 percent retardant, with a preferred range of from about 15 percent to about 35 percent plugging retardant. The same ratios of coupling agent to carrier as described above are maintained.

The solution containing the plugging retardant is used in the manner and in the amounts described above for the complexing agent solution; that is, broadly speaking, it is used as a preflush prior to the introduction of the consolidating agent into the formation.

The following examples may be relied upon to show the effectiveness of the plugging retardant in the described process.

*Example 3*

Two sand cores were prepared as described previously, and one of the cores was preflushed with 4,300 cc. of a 0.2 percent solution of $\gamma$-aminopropyltriethoxysilane in diesel oil. The permeability measured after the preflush was only approximately 43 percent of the original permeability.

The second cell was preflushed with 4,300 cc. of a 0.2 percent solution of $\gamma$-aminopropyltriethoxysilane in a mixture consisting of 20 percent isopropanol and 80 percent diesel oil.

After the preflush, the retained permeability was approximately 94 percent of original permeability; and after a standard resin treatment, the retained permeability was approximately 69 percent of the original permeability. The average crushing strength of the treated core was found to be approximately 1,736 p.s.i.

No standard resin treatment of the first core was attempted, inasmuch as the permeability was so low as to render plastic treatment quite difficult. It may be noted, however, that the core which was preflushed with a solution containing isoproponol had a permeability even after plastic treatment which was higher than the permeability of the initial core before plastic treatment.

The data obtained from the second core when compared with the crushing strengths observed in previous examples also show that the inclusion of isopropanol has slight, if any, effect on crushing strength.

The following additional tests were also run which also show the effectiveness of the plugging retardant in the described process.

*Example 4*

Two ¼-inch diameter cores of water-saturated Black Hawk "E" sand were initially flushed with 200 cc. of diesel fuel. Subsequently, one of the cores, Core A, was flushed with a solution made up of 2,000 parts of isopropanol, 8,000 parts of diesel oil, and 5 parts of $\gamma$-aminopropyltriethoxysilane. The remaining core, Core B, wes flushed with a solution consisting of 10,000 parts diesel oil and 5 parts $\gamma$-aminopropyltriethoxysilane. The following results were obtained from Core A:

| Volume throughout in cc.: | Percent of the original flow rate |
|---|---|
| 300 | 96 |
| 1,600 | 78 |

The following results were obtained from Core B:

| Volume throughout in cc.: | Percent of the original flow rate |
|---|---|
| 300 | 78 |
| 1,600 | 8 |
| 1,660 | [1] 0 |

[1] Extrapolated—complete plugging.

From this example, it may be readily seen that the addition of isopropanol to the solution significantly retarded the plugging rate. It should also be noted that the figure of 1,600 cc. in a ¼-inch diameter core is about 5.3 times the volume which would ordinarily be encountered under field conditions, since 300 cc. throughput in a ¼-inch core represents approximately the average throughput under field conditions.

*Example 5*

The same general procedure used in conducting the test on Core A in Example 4 was repeated. However, a number of other plugging retardants were used in the place of isopropanol. The results are shown below:

| Solvent | Volume Throughput | Percent Retained Permeability |
|---|---|---|
| Acetone | 1,800 | 83 |
| Ethylene glycol monobutyl ether | 1,960 | 85 |
| $\beta$-ethoxy ethyl acetate | 1,960 | 86 |
| $\beta$-methoxy ethyl acetane | 1,960 | 79 |
| Hexanol | 1,960 | 83 |
| Methyl ethyl ketone | 1,960 | 79 |

From the above data, it may be clearly seen that a variety of solvents may be used for reducing the effects of plugging in the formation consolidating technique taught herein.

*Example 6*

An additional run was made to further demonstrate the effectiveness of the present technique for consolidating loose materials. Prior to the conducting of this experiment, a phenol-formaldehyde resin was prepared in the following manner: A first solution consisting of 252 grams of 37 percent formaldehyde in a water solvent, 195 grams of phenol, and 25 grams of a 50 percent sodium hydroxide solution in a water solvent was mixed together in a 2,000-ml., 3-necked flask fitted with a stirrer, condenser, and thermometer. The solution was heated to 175° F. and held at this temperature for 1½ hours. At the expiration of this time, heat was removed from the flask, and the solution was allowed to cool to 107° F. When the solution reached this temperature, it was neutralized to a pH of about 4–6 with 27 cc. of a 32 percent aqueous HCl solution, whereupon the solution separated into two layers; the top layer was discarded, and the bottom layer was found to have a volume of about 265 cc. To the bottom layer was added 205 grams of resorcinol, and the resulting solution was diluted with an equal volume of ethanol.

A second solution was prepared by mixing together 279 grams of cresol, 267 grams of a 37 percent formaldehyde solution in a water solvent, 133 grams of paraformaldehyde, and 17.75 grams of a 50 percent aqueous sodium hydroxide solution. The cresol used consisted of 54 percent metacresol, 29 percent paracresol, and 17 percent phenol. After mixing, the ingredients were heated to 125° F., and the temperature was maintained at this level for 30 minutes. Subsequently, the solution was cooled to about 107° F. and neutralized with 15 percent aqueous HCl to a pH of about 4. At this time no layering was observed in the solution. Subsequently, 17.75 grams of sodium hydroxide were added; and the solution was again heated to and maintained at 125° F. for an additional 15 minutes, whereupon it separate into two layers. As in the preparation of the first solution, the top layer was discarded; and the lower layer, which was about 382 cc. in volume, was heated to 175° F. for about 1½ hours. The resulting mixture separated into two phases, and the upper phase was again discarded. The lower layer was diluted with an equal volume of ethanol.

Following the preparation of the two solutions, 33 cc. of the first solution and 33 cc. of the second solution were combined with 33 cc. of ethanol and 0.9 cc. of a 25 percent aqueous solution of sodium hydroxide. After these steps were taken, the resulting mixture was used in the standard phenol-formaldehyde resin treatment described previously. Results obtained from this experiment are designated Run B below.

For Run B, the same procedure was followed except that the core was given a preflush prior to the resin treatment with 4,000 cc. of a 0.2 percent solution of γ-aminopropyltriethoxysilane in 80 percent diesel oil and 20 percent isopropanol. The results of both of these runs are as follows:

| Run | Average Crushing Strength p.s.i. | Percent Retained Permeability |
| --- | --- | --- |
| A | 87 | 87 |
| B | 2,733 | 61 |

It will be noted that the results obtained in this operation are in favorable agreement with results previously reported.

*Example 7*

In order to demonstrate the feasibility of including the coupling agent directly in the resin mixture prior to injection of the mixture into the formation, two additional cores of Black Hawk "E" sand were prepared as described previously. Into each of the cores was then injected 100 cc. of a phenol-formaldehyde mixture. This mixture was substantially the same as that described previously in the discussion of the standard phenol-formaldehyde resin treatment. However, instead of using 0.9 cc. of a 25 percent aqueous NaOH solution, 1 cc. of γ-aminopropyltriethoxysilane was preblended with the resin mixture. After this treatment, the cores were cured for four hours at 160° F. and were then found to have a retained permeability of about 85 percent and an average crushing strength of about 1,285 p.s.i.

The values obtained from this process compare favorably with those values obtained when the coupling agent was added to the core separately.

*Example 8*

In addition to the methods described above in the general portion of the specification and demonstrated in the specific examples, there is another technique which may be employed in practicing one aspect of the present invention. More particularly, it is possible to practice one aspect of this invention by the utilization of a sand-phenol formaldehyde resin mixture-coupling agent slurry, usually in a carrier liquid. In practice, the slurry is first mixed at the wellhead and then pumped downhole where it is placed against the formation surrounding the wellbore or possibly into cracks and fissures in the formation which communicate with the wellbore. Subsequently, the area of the formation surrounding the wellbore will be maintained in a substantially static condition for a sufficient time to allow the resin to harden. This time will vary depending upon many factors which characterize both the mixture itself and formation conditions. Ordinarily from about 12 to about 48 hours will be adequate.

As in the case when coupling agent and resin mixture are injected into the formation, there is no criticality attached to the order in which the slurry components are added together. Ordinarily it will probably be most convenient to add the coupling agent directly to the resin mixture. However, satisfactory results will also be obtained when the coupling agent is added to the sand alone, or to a sand-resin mixture slurry. In general the range of satisfactory ratios between the coupling agent and phenol-formaldehyde resin mixture will be the same as that found suitable when the combined resin mixture and coupling agent are injected downhole. Similarly, when the coupling agent is introduced to the sand either before or after the sand is slurried with the phenol-formaldehyde resin mixture, the ratio between coupling agent and carrier will be in the same range of ratios which may be used when the coupling agent is injected into a formation as a preflush. The sand to resin mixture ratio is not critical; it only being necessary that there be sufficient resin to substantially completely coat the sand particles.

In general from about 5 to about 100 bulk unit volumes of sand per unit volume of resin material will be found satisfactory with a preferred range of from about 16 to 35, although either more or less sand may be used per volume of resin material without unduly limiting the efficacy of the technique. It is to be understood, of course, that the resin material will ordinarily be in a suitable solvent of which many are well known in the art. While the concentration of the resin solution is not critical, generally the solution will contain at least about 5% resin material when a solvent is used. It will be observed that the same ratio between solvent and resin material also applies when the resin material is injected directly into the formation. Additionally, when a carrier is used with the slurry, as it ordinarily will be, the same carrier material may be used which were described previously for use with the coupling agent. Generally the ratio between the coated sand and carrier is not critical although it will ordinarily be in the range of from about .1 to about 30 pounds of sand per gallon of carrier with a preferred range of from about 10 to about 20 pounds per gallon.

The preferred range of sand sizes is from about 20 to about 40 mesh. Sizes outside this range are allowable, however, and in general, sand as large as 4 mesh and as small as 200 mesh may be utilized.

Before considering the specific examples which demonstrate this technique, it should be pointed out that the use of a coupling agent in this embodiment of the invention is a critical part of the process. Absent a coupling agent, the resin mixture will not satisfactorily adhere to the sand grains during the process. This is true in spite of the fact that it has been found to adhere satisfactorily to particulate organic matter (U.S. Patent 2,941,594) under similar conditions.

In order to demonstrate the feasibility of this technique, 240 grams of 20- to 40-mesh Ottawa sand were stirred into 150 ml. of diesel oil to which had been added 0.4 ml. of γ-aminopropylethoxysilane. After agitation of the resulting mixture for approximately two minutes, the coated sand was then flushed with about 500 cc. of diesel oil and about 500 cc. of diesel oil were then added to the mixture. Subsequently, 50 ml. of an alcohol solution containing about 30% of the phenolformaldehyde resin mixture used in Example 1 was stirred into the sand-diesel oil-coupling agent mixture. Following agitation, the slurry was poured onto a 50 mesh screen and flushed with approximately 500 cc. of diesel oil.

After the slurry was thus prepared, it was introduced into a closed conduit which was approximately 12 feet long and ¾-inch in diameter. The total capacity of this closed conduit was approximately two liters. After being placed into the conduit, the slurry was pumped around the closed circuit at the rate of about 15 gallons per minute in order to simulate the step of pumping the slurry down a tubing string. After being pumped around the closed conduit for approximately 4 minutes, the slurry was shunted through a screen by which means the coated sand was recovered. After recovery of the sand, it was packed into a ⅞-inch plastic tube and cured at 160° F. After approximately 4½ hours curing time, the sand pack was found to have an average compressive strength of 839 p.s.i. and a permeability of approximately 40 darcies. After curing 5 days the average crushing strength was found to be about 1,830 p.s.i.

A second experiment was conducted which was similar in concept to the one described immediately above. In this experiment, however, 300 grams of the sand were introduced directly to the closed conduit before being coated with the resin mixture. Subsequently, 50 ml. of solution consisting of 30% phenol-formaldehyde resin mixture in alcohol together with 0.5 ml. of γ-aminopropylethoxysilane was introduced into the apparatus while the pump was running. After about 4 minutes the sand was removed and packed as described above.

At the end of 5 days during which time the resin-coated sand was maintained at 160° F., the sand packs were found to have an average crushing strength of about 2093 p.s.i.

From the foregoing description of the invention, it will be appreciated that the described process provides certain marked improvements in methods currently used for consolidating incompetent subterranean formations. Although certain specific examples have been given, it is not intended that the invention be limited to or circumscribed by the specific details of material, proportions, or conditions herein specified, since such materials, proportions and conditions may be varied or modified according to individual preference without operating outside the broad principle underlying the invention. For example, instead of using phenol formaldehyde as the resinous material to consolidate the formation or slurry with sand, other condensation products of water-soluble aldehydes and low molecular weight hydroxylaryl compounds may be used. Also a wide variety of the Werner complex-type compounds may be used as coupling agents as may numerous aminoorganosilanes. Moreover, numerous compounds other than those disclosed in the specific examples may be chosen to work effectively as a plugging retardant. Selection of specific compositions and the quantity thereof to be used will, as has been indicated, depend upon the problems posed by the particular formation which is to be consolidated.

Having fully described and illustrated the practice of the present invention, what we desire to claim as new and useful and to secure by Letters Patent is:

1. The method of consolidating incompetent formations which comprises the steps of:
   (a) mixing together siliceous sand, an organic, age hardenable resinous composition, and a coupling agent to form a slurry, said coupling agent comprising a chemical compound containing a first functional group which reacts with the particles of the sand and a second functional group which reacts with the resinous composition; and
   (b) positioning said slurry in contact with a portion of said formation.

2. The method defined in claim 1 wherein said resinous composition comprises a partially polymerized phenol formaldehyde resin mixture.

3. The method defined in claim 2 wherein said coupling agent comprises α-aminopropylethoxysilane.

4. The method defined in claim 1 wherein from about 5 to about 100 bulk unit volumes of sand are provided per bulk unit volume of resinous composition.

5. The method defined in claim 4 wherein from about 16 to about 35 bulk unit volumes of sand are provided per bulk unit volume of resinous composition.

6. The method defined in claim 4 wherein a carrier material is mixed with said sand, resinous composition and coupling agent in a ratio of from about .1 to about 30 pounds of sand per gallon of carrier material.

7. The method defined in claim 6 wherein from about 10 to about 20 pounds of sand are utilized per gallon of carrier material.

References Cited by the Examiner
UNITED STATES PATENTS 2,823,753 2/1958 Henderson et al. _____ 166—33
3,213,137 3/1964 Young et al. _____ 166—38 X CHARLES E. O'CONNELL, *Primary Examiner.*

S. J. NOVOSAD, *Assistant Examiner.*

UNITED STATES PATENT OFFICE
CERTIFICATE OF CORRECTION

Patent No. 3,285,339            November 15, 1966

Herbert C. Walther et al.

It is hereby certified that error appears in the above numbered patent requiring correction and that the said Letters Patent should read as corrected below.

Column 4, line 26, for "formula" read -- formulas --; column 10, line 38, strike out "a"; column 14, lines 25, 30 and 42, for "throughout", each occurrence, read -- throughput --; column 15, line 27, for "separate" read -- separated --; line 41, for "Run B" read -- Run A --; column 18, line 34, for "$\alpha$" read -- $\gamma$ --.

Signed and sealed this 12th day of September 1967.

(SEAL)
Attest:

ERNEST W. SWIDER            EDWARD J. BRENNER
Attesting Officer            Commissioner of Patents